United States Patent
Matsuzawa

(10) Patent No.: US 7,761,257 B2
(45) Date of Patent: Jul. 20, 2010

(54) APPARATUS AND METHOD FOR EVALUATING OPTICAL SYSTEM

(75) Inventor: Toshiaki Matsuzawa, Tokyo (JP)

(73) Assignee: Olympus Corporation, Tokyo (JP)

( * ) Notice: Subject to any disclaimer, the term of this patent is extended or adjusted under 35 U.S.C. 154(b) by 58 days.

(21) Appl. No.: 12/117,372

(22) Filed: May 8, 2008

(65) Prior Publication Data

US 2008/0281556 A1     Nov. 13, 2008

(30) Foreign Application Priority Data

May 9, 2007    (JP)   .............................. 2007-124682

(51) Int. Cl.
*G01B 7/00*     (2006.01)
(52) U.S. Cl. .................................... 702/155
(58) Field of Classification Search .................. 702/155
See application file for complete search history.

(56) References Cited

U.S. PATENT DOCUMENTS

| | | | |
|---|---|---|---|
| 5,402,224 A | | 3/1995 | Hirukawa et al. |
| 5,581,347 A | * | 12/1996 | Le Saux et al. ............. 356/124 |
| 5,661,816 A | | 8/1997 | Fantone et al. |
| 6,195,159 B1 | | 2/2001 | MacDonald et al. |
| 6,788,401 B1 | | 9/2004 | Kitabayashi et al. |
| 7,307,706 B2 | * | 12/2007 | Veitch ........................ 356/124 |
| 2004/0212680 A1 | | 10/2004 | Schroeder et al. |
| 2005/0237506 A1 | * | 10/2005 | Reisinger et al. .............. 355/55 |
| 2006/0203235 A1 | * | 9/2006 | Leslie et al. ............. 356/237.4 |

FOREIGN PATENT DOCUMENTS

| | | |
|---|---|---|
| DE | 103 28 145 A1 | 1/2005 |
| EP | 1 785 714 A2 | 5/2007 |
| JP | 2004-163207 | 6/2004 |
| JP | 2006-195790 | 7/2006 |
| WO | WO 03/091685 A1 | 11/2003 |

\* cited by examiner

*Primary Examiner*—Aditya Bhat
(74) *Attorney, Agent, or Firm*—Scully, Scott, Murphy & Presser, P.C.

(57) ABSTRACT

An apparatus is for evaluating optical characteristics of an optical system based on an image forming position of a point image formed through the optical system. The apparatus includes a point image producing unit that forms a point image through the optical system in each point light source; an imaging unit that images the point images to produce a point image distribution image; and a moving unit that changes relative distance between the optical system and the point light source or the imaging unit in an optical axis direction. The apparatus also performs processing of detecting an image forming position in each different relative distance of the point image based on image information of the point image distribution images, the processing including calculating a regression expression for the detected image forming positions to obtain a shape parameter of the image axis in each of the point images.

49 Claims, 8 Drawing Sheets

APPARATUS AND METHOD FOR EVALUATING OPTICAL SYSTEM

CROSS-REFERENCE TO RELATED APPLICATIONS

This application is based upon and claims the benefit of priority from Japanese Patent Application No. 2007-124682, filed May 9, 2007, the entire contents of which are incorporated herein by reference.

BACKGROUND OF THE INVENTION

1. Field of the Invention

The present invention relates to an optical system evaluation apparatus, which evaluates optical characteristics of an optical system to be evaluated on the basis of an image forming position of a point image formed through the optical system and an optical system evaluation method.

2. Description of the Related Art

In general, when an image imaged by using an optical system is used for length measurement, the optical system is required to have high telecentricity. The telecentricity represents a state in which all main beams at the object side or an image side are parallel to an optical axis, regardless of the distance from the optical axis. By way of example, an object-side telecentric optical system is used in a length measuring microscope. In this case, even if an object to be imaged is moved away from the focus position, the image forming position corresponding to an arbitrary point on the object is not changed. Thus, it is possible to measure the distance between two points on the object with high accuracy without depending on the focusing state or a placement position of the object.

In the prior art, as the evaluation apparatus for an optical system, there has been known especially the evaluation apparatus which evaluates resolution of lens (e.g., see Japanese Patent Application Laid-Open No. 2004-163207). In the evaluation apparatus described in the patent document, an aerial image formed by a lens to be examined is imaged, and the MTF of the lens to be examined is calculated on the basis of the information of the imaged image. This method for evaluating the optical characteristics of the optical system by observing the aerial image formed by the optical system such as lens is well-known, and the technique for evaluating the telecentricity of the optical system by using this method is widely known. Here, the prior art for evaluating the telecentricity of the optical system is described with reference to FIG. 11. FIG. 11 shows an example of evaluating an image-side telecentric optical system.

As shown in FIG. 11, in the prior art optical system evaluation apparatus, a pin-hole 71 as a point light source is provided on an object surface of an optical system 72 to be evaluated, and is illuminated from behind by an illumination means (not shown). A point image 73 as the aerial image of the pin-hole 71 is formed on the image surface of the optical system 72 to be evaluated. However, since this point image 73 is small, it is difficult to measure the image forming position with the maximum intensity with high accuracy even if the point image 73 is directly imaged by an imaging device. Therefore, the image enlarged by an enlargement optical system 74 is imaged by the imaging device 75. Thus, the image forming position of the point image 73 can be determined by retrieving a pixel with the maximum brightness from the image region in which the enlarged image is imaged.

Further, images are sequentially imaged while moving the enlargement optical system 74 and the imaging device 75 in the optical axis direction (Z axis direction) of the optical system 72 to be evaluated and a pixel with the maximum brightness is retrieved from each image sequentially imaged, whereby it is possible to detect the lateral shift of the X and Y coordinates of the image forming position accompanying the change of the Z coordinates. Further, the tendency of the change of the lateral shift with respect to the Z coordinates is calculated, whereby the telecentricity corresponding to the point image 73 can be evaluated. Moreover, this measurement is applied to a plurality of the point images 73, whereby the distribution of image-side telecentricity of the optical system 72 to be evaluated can be evaluated.

However, in order to calculate the X, Y and Z coordinates of the image forming position of the point image 73, the respective positions of the enlargement optical system 74 and the imaging device 75 should be monitored by a triaxial measuring instrument. Meanwhile, in order to evaluate the distribution of the telecentricity in the entire view field of the optical system 72 to be evaluated, the image should be measured while moving the pin-hole 71 to a plurality of positions on the object surface. In this case, the X and Y coordinates of the pin-hole 71 should also be monitored by the length measuring instrument.

There has been known that the coma aberration influences the tendency of the change of the lateral shift of the image forming position with respect to the Z coordinates. When there is no coma aberration, the lateral shift of the image forming position is linearly changed with respect to the Z coordinates, while as the coma aberration is increased, the lateral shift is changed in a curved line.

SUMMARY OF THE INVENTION

An apparatus according to an aspect of the present invention is for evaluating optical characteristics of an optical system based on an image forming position of a point image formed through the optical system. The apparatus includes a point image producing unit that has a plurality of point light sources arranged in a planar form, and forms a point image through the optical system in each of the point light sources; an imaging unit that images a plurality of the point images to produce a point image distribution image; and a moving unit that changes relative distance between the optical system and the point light source or the imaging unit in an optical axis direction of the optical system. The apparatus also includes an imaging control unit that controls the moving unit to change the relative distance, and controls the imaging unit to image the point image distribution image in every change of the relative distance; an image axis shape calculation unit that performs processing of detecting an image forming position in each different relative distance of the point image based on image information of a plurality of the point image distribution images imaged at the different relative distance, the processing including calculating a regression expression for a plurality of detected image forming positions to obtain a shape parameter of the image axis determined by the regression expression in each of the plurality of point images; and an evaluation value calculation unit that fits a characteristic distribution model function representing distribution of the optical characteristics to the shape parameter in each of the plurality of point images, and calculates an evaluation value of the optical characteristics based on the fitting characteristics distribution model function.

A method according to another aspect of the present invention is for evaluating optical characteristics of an optical system based on an image forming position of a point image formed through the optical system. The method includes forming a point image through the optical system in each of a plurality of point light sources arranged in a planar form; imaging a plurality of the point images by an imaging unit to produce a point image distribution image; changing relative distance between the optical system and the point light source or the imaging unit in an optical axis direction of the optical system; and controlling the imaging unit to image the point image distribution image in every change of the relative distance. The method also includes performing, in each of the plurality of point images, processing for detecting an image forming position in each different relative distance of the point image based on image information of a plurality of the point image distribution images imaged at the different relative distance, the processing including calculating a regression expression for a plurality of detected image forming positions to obtain a shape parameter of the image axis determined by the regression expression in each of the plurality of point images; fitting a characteristic distribution model function representing distribution of the optical characteristics to the shape parameter; and calculating an evaluation value of the optical characteristics based on the fitting characteristics distribution model function.

A computer program product according to still another aspect of the present invention causes a computer to perform the method according to the present invention.

The above and other objects, features, advantages and technical and industrial significance of this invention will be better understood by reading the following detailed description of presently preferred embodiments of the invention, when considered in connection with the accompanying drawings.

DETAILED DESCRIPTION OF THE PREFERRED EMBODIMENTS

Figure 1:
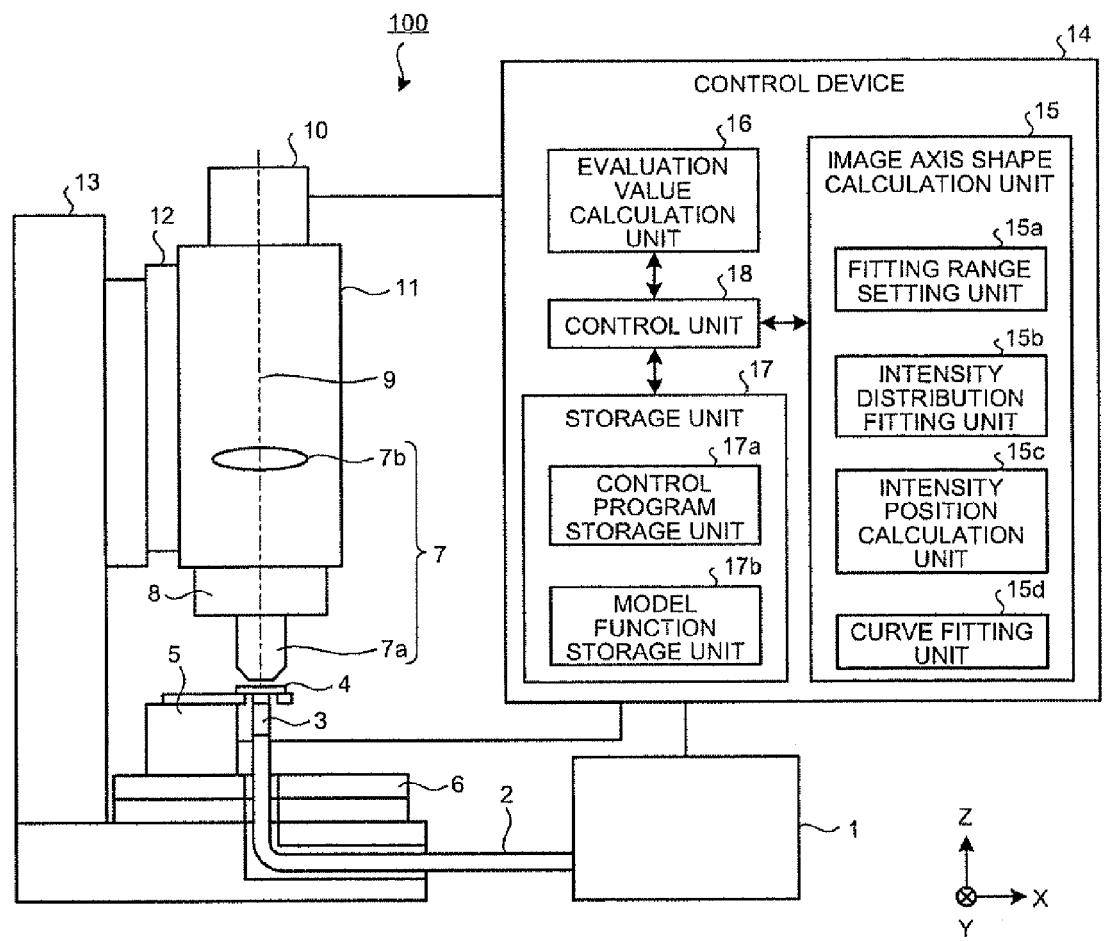
FIG. 1 is a diagram showing a configuration of an optical system evaluation apparatus according to the first embodiment of the present invention.

Exemplary embodiments of an apparatus and a method for evaluating an optical system, according to the present invention, will be described in detail below with reference to the drawings. Note that the present invention is not limited to these embodiments. The same components are assigned the same reference numerals.

First, an optical system evaluation apparatus according to a first embodiment of the present invention is described. FIG. 1 shows relevant parts of a lens evaluation apparatus 100, which is the optical system evaluation apparatus according to the first embodiment. As shown in FIG. 1, the lens evaluation apparatus 100 is provided with a sample 4 in which a plurality of pin-holes are arranged in a planar form, a light source 1 as an illumination means for illuminating the sample 4, an optical fiber 2, a light intensity uniformization part 3, a Z axis stage 5 which is a movement means for holding the sample 4 and moving the sample 4 in the Z axis direction, and an XY stage 6 for moving the sample 4 in the X axis direction and the Y axis direction.

The lens evaluation apparatus 100 is further provided with an image forming lens 7b which constitutes a microscope optical system 7 with an objective lens 7a as an optical system to be evaluated and forms an observation image of the sample 4, a lens barrel 11 holding the image forming lens 7b therein, a rotation part 8 which is provided in a bottom part of the lens barrel 11 and rotatably holds the objective lens 7a around an optical axis 9 thereof, an imaging device 10 which is provided in an upper part of the lens barrel 11 and images the observation image of the sample 4 formed by the microscope optical system 7, an up/down movable stage 12 which supports the lens barrel 11 movably in an up and down direction, and a mirror substrate 13 which supports the up/down movable stage 12.

The light source 1 includes a white light source (not shown), a wavelength selection mechanism, and a light intensity adjustment mechanism. As the white light source, for example a halogen lamp, a xenon lamp, an LED, or the like is used. The wavelength selection mechanism holds a plurality of interference filters, and is constituted by using a rotation holder which can selectively provide one of the interference filters in a light path. The light intensity adjustment mechanism is constituted by using for example a rotatable ND filter in which the transmittance can be continuously changed within a range of 0 to 100%. The wavelength selection mechanism and the light intensity adjustment mechanism are driven and controlled on the basis of a control signal from a control device 14 to be described later, and can arbitrarily set (select and switch) the central wave length of the light emitted from the light source 1 and the intensity within a predetermined range. The wavelength selection mechanism can be constituted by using other spectroscopic device. The light source 1 can be constituted by using a plurality of light sources emitting light having different wavelengths.

The light emitted by the light source 1 is guided through the optical fiber 2, and thereafter uniformed in the intensity position and the angle distribution by the light intensity uniformization part 3 to trans-illuminate the sample 4. The light intensity uniformization part 3 is configured by using a rod glass, a diffusion plate, or the like in which internal reflection is repeated.

Figure 2:
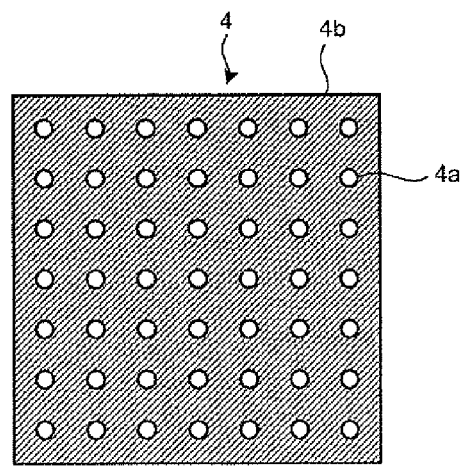
FIG. 2 is a view showing a pin-hole array specimen.

The sample 4 is a pin-hole array specimen in which a plurality of pin-holes 4a are two-dimensionally arranged as shown in FIG. 2. The pin-holes 4a arranged in a lattice pattern at an equal interval in the lateral and longitudinal directions are opened on an opaque metal film 4b evaporated on a glass substrate. The diameters of all the pin-holes 4a are the same and are smaller than the refraction limit of the objective lens 7a. Specifically, it is equivalent to or less than the resolution of the optical system to be evaluated. Thus, in addition to the function of the optical intensity uniformization part 3, light whose intensity angle distribution is almost uniformed in a range wider than the angular aperture of the objective lens 7a is emitted from each pin-hole 4a, whereby each pin-hole 4a acts as the point light source. The distribution range of the pin-holes 4a is made wider than the view field of the objective lens 7a as the optical system to be evaluated.

The Z axis stage 5 moves the sample 4 up and down in the direction of the optical axis 9 of the microscope optical system 7. In the lens evaluation apparatus 100, the optical axis 9 of the microscope optical system 7 is parallel to the Z axis. The Z axis stage 5 is constituted by using a piezo stage including an electrostatic capacity sensor for monitoring the amount of displacement and driven and controlled on the basis of a control signal from a control device 14 to be described later, and therefore can move the sample 4 to an arbitrary Z axis position in a predetermined range. An XY stage 6 is a manual stage which can move the Z axis stage 5 and the sample 4 in a direction perpendicular to the optical axis 9 of the microscopic optical system 7.

The microscopic optical system 7 forms the observation image of the sample 4 on the imaging surface of an imaging device 10. The imaging device 10 is a two-dimensional imaging device, such as a two-dimensional CCD having an imaging surface which is larger than the image forming range of the observation image of the sample 4 formed by the microscopic optical system 7 or can image most part of the image forming range. The rotation part 8 can rotate and fix the objective lens 7a at an arbitrary angle using the optical axis 9 as the rotation axis.

The lens evaluation apparatus 100 is further provided with the control device 14 which controls the entire processing and operation of the lens evaluation apparatus 100. The control device 14 is provided with an image axis shape calculation unit 15, an evaluation value calculation unit 16, a storage unit 17, and a control unit 18. The image axis shape calculation unit 15 calculates a shape parameter of an image axis to be described later in each pin-hole image, which is the observation image of the pin-holes 4a formed by the microscope optical system 7. The evaluation value calculation unit 16 fits a model function representing the distribution of the optical characteristics to be evaluated to the shape parameter of the image axis in each pin-hole image and calculates the evaluation value of the optical characteristics on the basis of the fitting model function. The storage unit 17 stores various information. The control unit 18 controls the processing and operation of each unit electrically connected to each other. The control unit 18 is electrically connected to the image axis shape calculation unit 15, the evaluation value calculation unit 16, and the storage unit 17, and in addition, electrically connected to the light source 1, the Z axis stage 5, the imaging device 10, and the like through an interface (not shown).

The image axis shape calculation unit 15 is provided with a fitting range setting unit 15a and an intensity distribution fitting unit 15b. The fitting range setting unit 15a sets a fitting range where the intensity distribution model function for detecting the maximum intensity position in each pin-hole image is fitted. Regarding the observation image imaged by the imaging device 10, in the observation image corresponding to the fitting range set by the fitting range setting unit 15a, the intensity distribution fitting unit 15b fits the intensity distribution model function to a point image region on which the pin-hole image as the point image is imaged. The image axis shape calculation unit 15 is further provided with an intensity position calculation unit 15c and a curve fitting unit 15d. The intensity position calculation unit 15c detects a planar coordinate on the observation image with the maximum intensity distribution model function and calculates the maximum intensity position of the pin-hole image on the basis of the planar coordinate. The curve fitting unit 15d fits a curve model function to a plurality of the maximum intensity positions calculated at different positions in the Z axis direction and obtains a coefficient of the fitting curve model function as the shape parameter of the image axis determined by the fitting curve model function.

The storage unit 17 stores image data of the observation image imaged by the imaging device 10 and the various information such as various processing parameters used for processing performed by the control unit 18. Especially, the storage unit 17 is provided with a control program storage unit 17a in which various control programs executed by the control unit 18 are stored and a model function storage unit 17b in which various model functions used for processing performed by the image axis shape calculation unit 15 or the evaluation value calculation unit 16 are stored.

The control unit 18 executes the control program stored in the control program storage unit 17a and thereby controls the processing and operation of each unit. Specifically, the control unit 18 changes sequentially the relative distance between the sample 4 and the microscope optical system 7 in the direction of the optical axis 9 with the aid of the Z axis stage 5 to make the imaging device 10 image the pin-hole image of each pin-hole 4a in every change of the relative distance, and, thus, to control the production of the observation image. In addition, the control unit 18 controls the calculation of the evaluation value of the optical characteristics of the microscope optical system 7 by the image axis shape calculation unit 15 and the evaluation value calculation unit 16 on the basis of the image information of the observation images imaged at a different relative distance.

The control device 14 is provided as a computer. The image axis shape calculation unit 15, the evaluation value calculation unit 16, and the control unit 18 are realized by a CPU. The storage unit 17 is realized by using a hard disk, ROM, RAM, and the like. The control device 14 further includes an input unit, a display unit, and an output unit which respectively perform the input, display, and output of various information.

Next, the operation of the lens evaluation apparatus 100 is described. First, an operator mounts the objective lens 7a to be evaluated on the rotation part 8, and mounts the sample 4, in which the pin-holes 4a with a pin-hole diameter suitable for the objective lens 7a are formed, on the Z axis stage 5. Then, while the image to be imaged by the imaging device 10 is monitored on the screen of the display unit of the control device 14, positioning of the sample 4 on the XY stage 6 and focusing by the up/down movable stage 12 or the Z axis stage 5 are performed. This focusing may not be performed manually, but may be performed automatically by providing, for example, an automatic focusing unit in the lens evaluation apparatus 100.

After focusing in this manner, the execution of a predetermined imaging program is started by the control unit 18 of the control device 14. This imaging program is a part of the control program stored in the control program storage unit 17a and controls the automatic imaging of a stack image in each wavelength. The stack image represents a series of the observation images (observation image group), which have been sequentially imaged at a different relative distance by the imaging device 10 while the Z axis stage 5 changes sequentially the relative distance between the sample 4 and the objective lens 7a. The plurality of wavelengths represent a reference wavelength, which is a reference in the evaluation of the telecentricity and a coma aberration as the optical characteristics of the microscope optical system 7, and a plurality of evaluation wavelengths to be evaluated.

Figure 3:
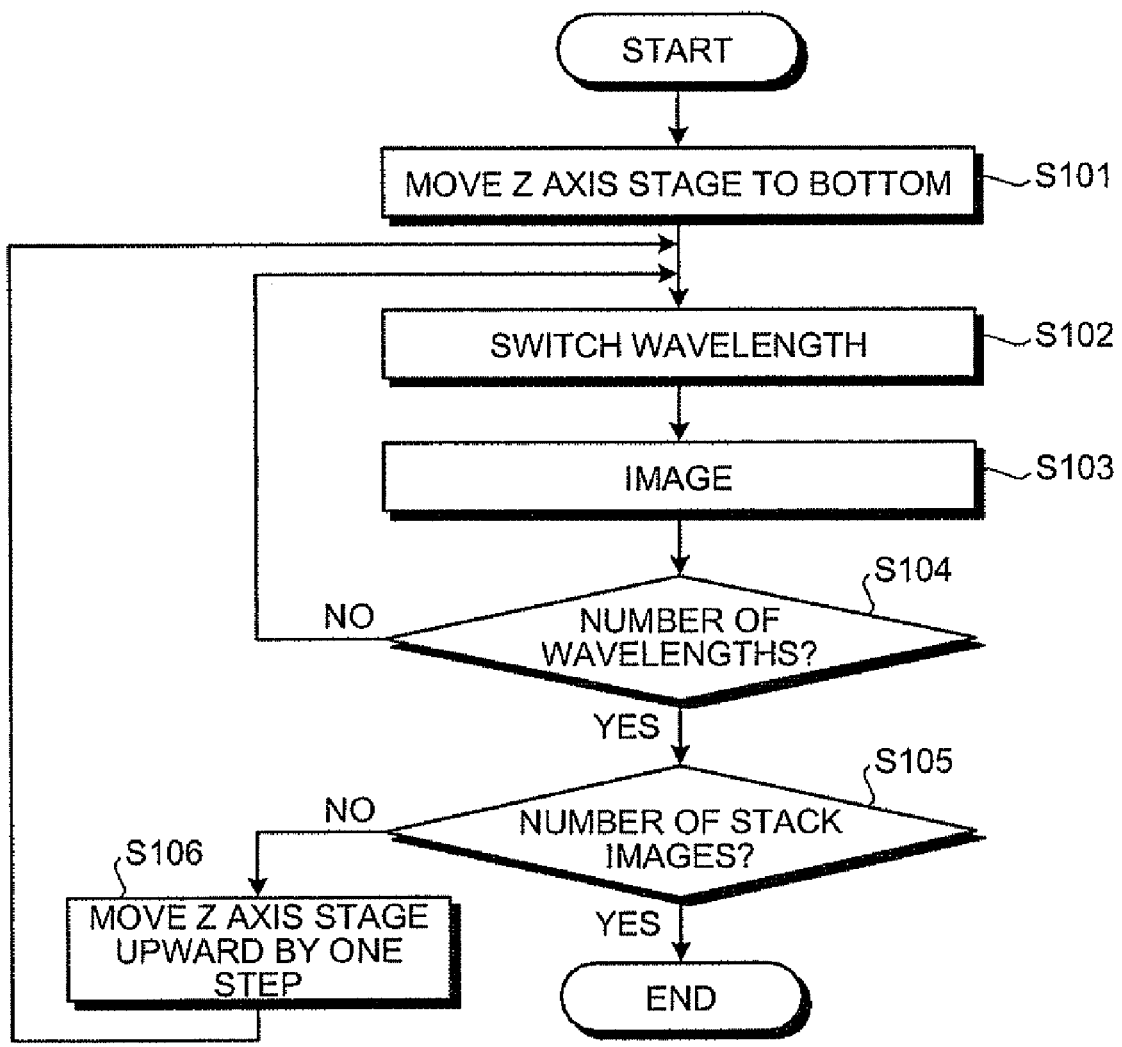
FIG. 3 is a flowchart showing an imaging processing procedure of a stack image.

FIG. 3 is a flowchart showing an imaging processing procedure for obtaining the stack image of a plurality of wavelengths by the execution of the imaging program by the control unit 18. As shown in FIG. 3, the control unit 18 first moves the Z axis stage 5 from the focusing position (the above-mentioned position after focusing) to the bottom of the imaging range (step S101). The imaging range in the Z axis direction is desirably set to be several times of focal depth in such a way as to include the respective ranges of the field curvature and chromatic aberration in the longitudinal direction of the objective lens 7a to be evaluated.

Subsequently, the control unit 18 switches an interference filter of the wavelength selection mechanism in the light source 1 and switches the illumination light to one wavelength in which the observation image is not imaged yet in the current Z axis stage position, among the plurality of wavelengths (step S102). In addition, in the step S102, the control unit 18 switches the tight amount of the illumination light, applied to the sample 4, to an appropriate light amount by an ND filter (light amount adjustment mechanism) in the light source 1. This light amount is set in advance in such a way that the respective brightness of the stack image by the plurality of wavelengths is matched to the same level.

Subsequently, the control unit 18 makes the imaging device 10 image the observation image of the sample 4, and the imaging device 10 then transfers the image file to the control device 14 (step S103). The transferred image file is stored in the storage unit 17 in the control device 14.

Subsequently, the control unit 18 determines whether the steps S102 and S103 are applied to all of the plurality of wavelengths in the current Z axis stage position, in other words, determines whether the number of the wavelength used for imaging has reached a predetermined number (step S104). When the number of the wavelength has reached the predetermined number (S104: Yes), the control unit 18 proceeds to a step S105, while when the number has not reached the predetermined number (S104: No), the processing from the step S102 is repeated. As described above, the processings in the steps S102 and S103 are repeated until the number of the wavelength used for imaging has reached the predetermined number, whereby the image file of the observation image of each of the plurality of wavelengths in the current Z axis stage position is transferred to the control device 14 to be stored in the storage unit 17.

Subsequently, the control unit 18 determines whether the number of the image file of each wavelength stored in the storage unit 17 has reached the number of the stack image covering a predetermined imaging range in the Z axis direction (step S105). When the number has reached the number of the stack images (S105: Yes), the control unit 18 terminates the imaging processing, while when the number has not reached the number of the stack image (S105: No), the control unit 18 moves the Z axis stage 5 upward by one step (step S106), and thereafter, repeats the processing from the step S102. The movement amount of one step is desirably about ⅕ to ⅒ of the focal depth of the objective lens 7a to be evaluated.

As described above, the steps S102 through S104 and S106 are repeated until the step S105 is satisfied, whereby, as the stack images, all the image files of the plurality of wavelengths for the number of stack images covering the predetermined imaging range in the Z axis direction are stored in the storage unit 17.

In this imaging processing procedure, the processing for sequentially switching the plurality of wavelengths every time the Z axis stage 5 is moved upward by one step to image the observation image of each wavelength is repeated, whereby the stack images with the plurality of wavelengths are simultaneously imaged. Thus, the drift of the position of the sample 4 progressing within a series of imaging processing time due to the change of environmental temperature or the like becomes almost the same in each wavelength. This is effective in reducing an error in the calculation of the telecentricity and the coma aberration, which is described later.

Next, a predetermined analysis program executed by the control unit 18 of the control device 14 is started. This analysis program is a part of the control program stored in the control program storage unit 17a and controls to automatically calculate the evaluation value between the telecentricity and the coma aberration, which are the optical characteristics of the microscopic optical system 7 including the objective lens 7a, from the image file of the stack image stored in the storage unit 17.

Figure 4:
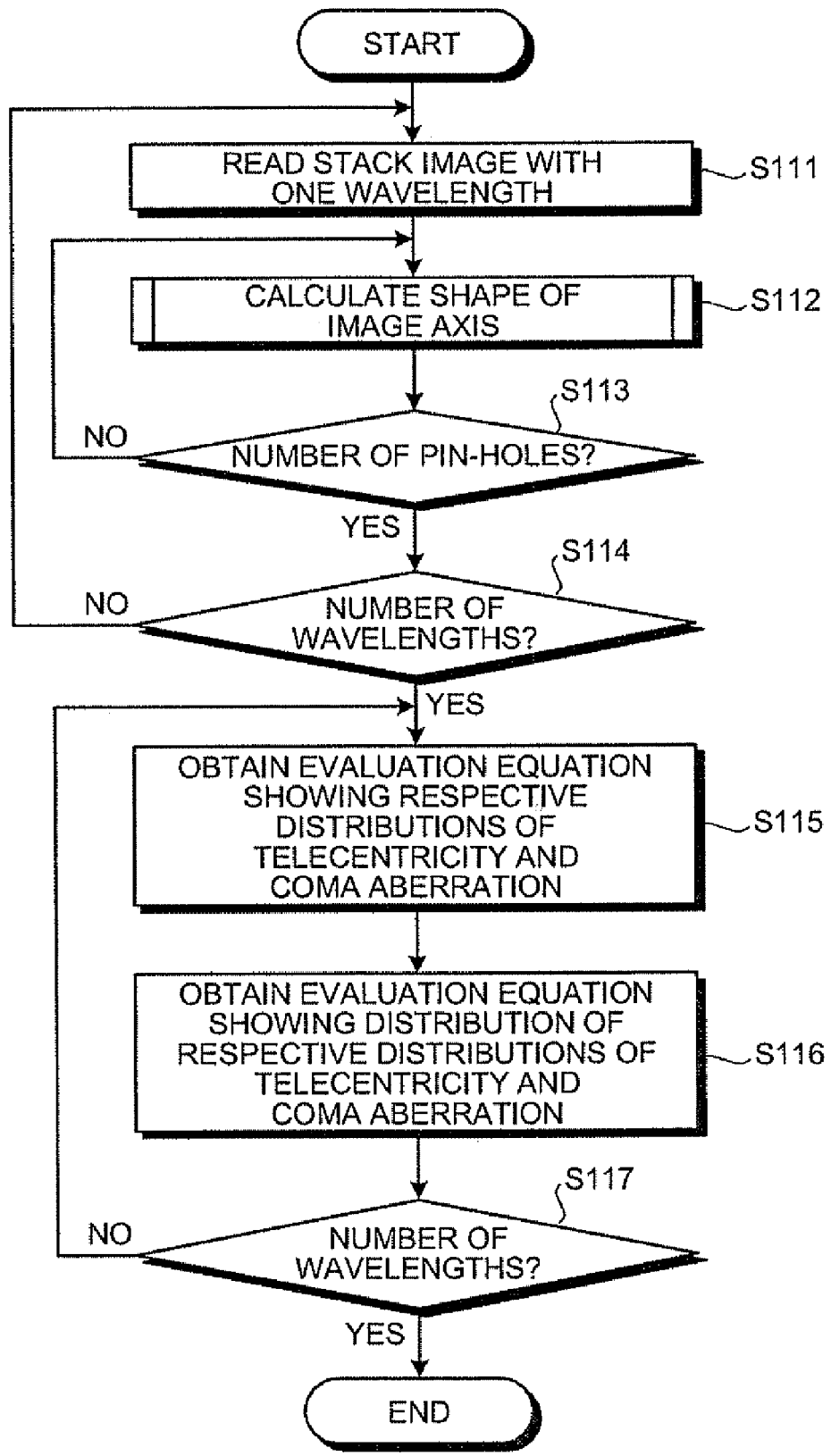
FIG. 4 is a flowchart showing an analysis processing procedure for obtaining distribution of optical characteristics.

FIG. 4 is a flowchart showing an analysis processing procedure for calculating the evaluation values of the telecentricity and the coma aberration of the microscope optical system 7 by the execution of the analysis program by the control unit 18. As shown in FIG. 4, the control unit 18 first reads the stack image of one length, in which the shape of the image axis is not obtained yet in the plurality of wavelengths, from the image file stored in the storage unit 17 (step S111).

Subsequently, the control unit 18 makes the image axis shape calculation unit 15 calculate the shape of the image axis from one pin-hole image within the imaging range of the stack image of one wavelength, in which the shape of the image axis is not obtained yet (step S112). The shape of the image axis represents a relational expression of the movement amount of the pin-hole image in the X and Y axes directions in the imaging position to the movement amount in the Z axis direction of the sample 4. However, since a sampling interval of imaging (a pixel interval of the imaging device 10) is approximately ⅕ to ⅒ of the size of the pin-hole image, the shape of the image axis cannot be obtained with high accuracy simply by retrieving for a pixel position with the maximum brightness. Therefore, in the step S112, the shape of the image axis is calculated according to the procedure shown in FIG. 5.

Figure 5:
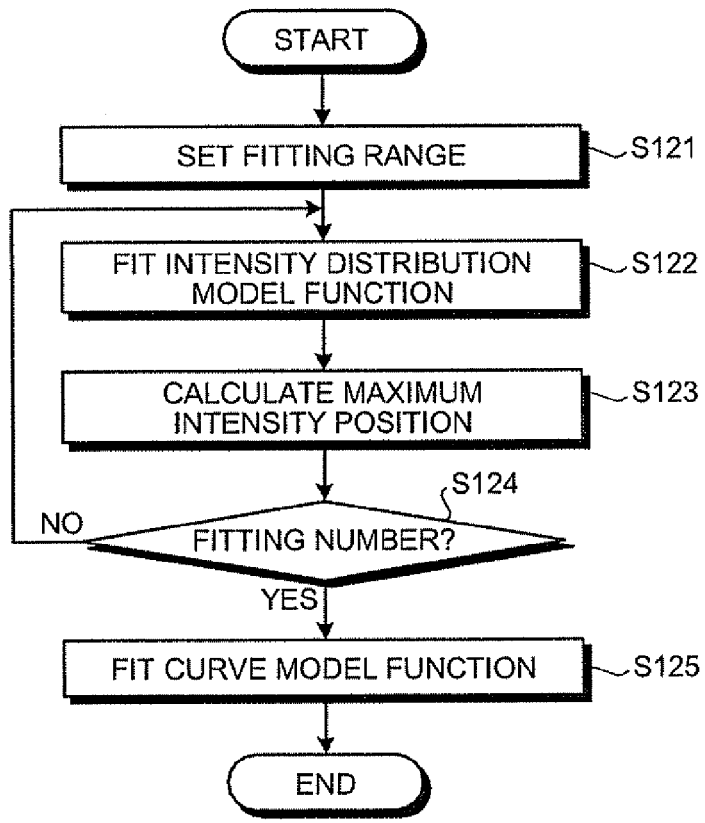
FIG. 5 is a flowchart showing a processing procedure for calculating a shape of an image axis.

FIG. 5 is a flowchart showing a calculation processing procedure for calculating the shape of the image axis. As shown in FIG. 5, the fitting range setting unit 15a first sets a range where an intensity distribution model function is fitted to a pin-hole image as the aerial image (step S121). Here, to fit means to apply.

The intensity of the pin-hole image gradually decreases as the pin-hole image is farther from the maximum intensity position. In the neighborhood of the maximum intensity, since the change monotonously decreases and is gradual, it is easy to fit a simple intensity distribution model. In this case, the fitting range of the longitudinal direction (Z axis direction) is assumed to be the focal depth of the objective lens 7a. The fitting range of the lateral direction (X and Y axes directions) is assumed to be within ½ of the radius of an airy disk. These values can be calculated to be $\lambda/NA^2$ and $0.3\lambda/NA$, respectively, with the numerical aperture NA of the objective lens 7a to be evaluated and the wavelength $\lambda$ of the illumination light.

Firstly, the fitting range setting unit 15a retrieves a pixel with the maximum brightness from the image region where the pin-hole image is imaged on the stack image. A sampling point included within the cylindrical fitting range with the pixel position as the center is made a fitting target, which is described below. The fitting range may also be finely adjusted by increasing or reducing the values.

Subsequently, in order to calculate the maximum intensity $I_{max}$ of one, to which the intensity distribution model function is not fitted yet, of the leaf images included in the fitting range of the longitudinal direction and its maximum intensity position $(x_c, y_c)$, the intensity distribution fitting unit 15*b* fits the intensity distribution model function I(x, y) (step S122). Here, the leaf image means each observation image included in the stack image.

Figure 6:
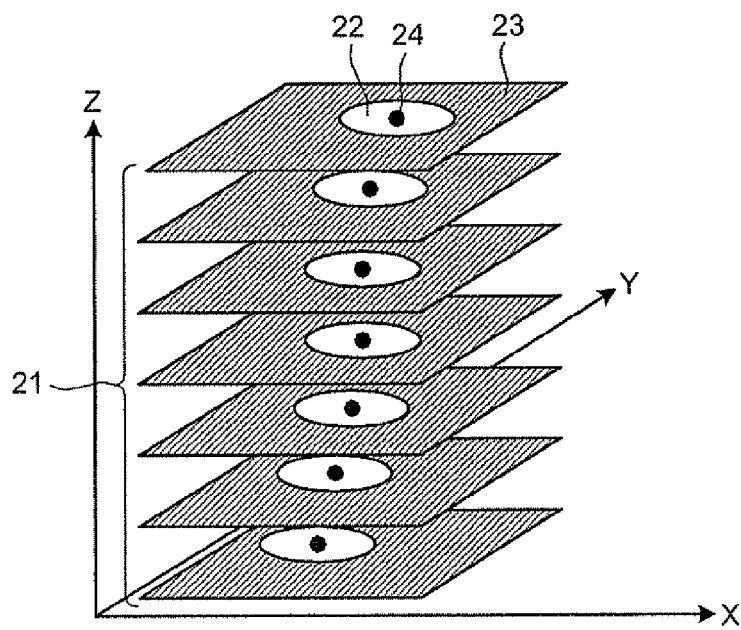
FIG. 6 is a view for explaining the calculation processing of the shape of the image axis.

FIG. 6 is a view showing the stack image in one pin-hole image. In this stack image 21, a cross section 22 of the pin-hole image is sampled (imaged) in each leaf image 23 for each Z axis position. The intensity distribution model function I(x, y) of the cross section 22 is fitted to the sampling point within the fitting range of one leaf image 23 by the least square method. In this embodiment, the rotation-symmetrical two-dimensional Gaussian distribution function, represented by the following equation (1), is adopted as the intensity distribution model function which can be easily fitted to the intensity distribution in the neighborhood of the maximum intensity position.

$$I(x,y)=I_{max}\cdot\exp\left[-b^2\{(x-x_c)^2+(y-y_c)^2\}\right] \quad (1)$$

Then, the intensity position calculation unit 15*c* calculates the maximum intensity position $(x_c, y_c)$ of one leaf image 23 from the fitting intensity distribution model function I(x, y) (step S123). The calculated maximum intensity position $(x_c, y_c)$ is also planar coordinates of the maximum value of the fitting intensity distribution model function I(x, y). By such a calculation, the maximum intensity position $(x_c, y_c)$ of one leaf image can be obtained with higher accuracy than the sampling interval in the original X and Y axes directions. The sampling interval in the original X and Y axes directions is, for example, a sampling interval on the object side, which is determined by the pixel interval of the imaging device 10 and the lateral magnification of an optical system to be evaluated.

Although in the step S123, on the basis of the intensity distribution model function I(x, y) fitted to the sampling point in the fitting range of one leaf image, the intensity position calculation unit 15*c* calculates the maximum intensity position $(x_c, y_c)$, alternatively a pixel with the maximum brightness value is retrieved from the sampling points within the fitting range of one leaf image, and the position of the brightness value is calculated. In this case, although in the latter, the accuracy of an image forming position to be calculated is inferior to the former, if there are a sufficient number of pin-holes 4*a* within an imaging view field, an evaluation equation which represents each distribution of the telecentricity and the coma aberration and where the error of each shape of the image axis is balanced out by each other can be obtained by the fitting of a model function, which is described later. When the pixel with the maximum brightness value is retrieved, the fitting range set in the step S121 is used as the retrieval range of the pixel with the maximum brightness value.

Then, the control unit 18 determines whether the intensity distribution model function I(x, y) is fitted to all the leaf images included in the fitting range of the longitudinal direction, in other words, whether the number of the leaf images to which the intensity distribution model function I(x, y) is fitted has reached a predetermined fitting number (step S124). When the number of the leaf images has reached the predetermined fitting number (S124: Yes), the control unit 18 proceeds to a step S125, while when the number has not reached the predetermined fitting number (S124: No), the processing from the step 122 is repeated. As described above, by repeating the steps S122 and S123 until the step S124 is satisfied, the maximum intensity position $(x_c, y_c)$ of each of the leaf images included in the fitting range of the longitudinal direction can be calculated. In FIG. 6, a position 24 of each leaf image 23 represents the maximum intensity position $(x_c, y_c)$ of each obtained leaf image.

Subsequently, the curve fitting unit 15*d* fits a linear model function, which is a curve model function and represented by the following equations (2) and (3), to each component of the maximum intensity position $(x_c(z), y_c(z))$ of each leaf image as a function of Z axis coordinates by the least square method and calculates a straight line corresponding to the regression expression defining the image axis corresponding to the telecentricity (step S125). As described below, the inclination of the image axis by nontelecentricity can be approximated by the above straight line:

$$x_c(z)=a_x\cdot z+b_x \quad (2)$$

$$y_c(z)=a_y\cdot z+b_y \quad (3)$$

In the step S125, the curve fitting unit 15*d* fits a quadratic curve model function, which is a curve model function and represented by the following equations (4) and (5), to each component of the maximum intensity position $(x_c(z), y_c(Z))$ of each leaf image by the least square method and calculates the quadratic curve corresponding to the regression expression defining the image axis corresponding to the coma aberration. The quadratic coefficients $c_x$, $c_y$ of the respective quadratic curves represent the curvature of the image axis. When the coma aberration is small, the curvature of the image axis is approximately proportional to the coma aberration.

$$x_c(z)=c_x\cdot z^2+d_x\cdot z+e_x \quad (4)$$

$$y_c(z)=c_y\cdot z^2+d_y\cdot z+e_y \quad (5)$$

Further, the curve fitting unit 15*d* converts the inclination of the image axis $a_x$ and $a_y$ as the shape parameter of the image axis and the curvatures $c_x$ and $c_y$ which have been calculated as above described to the real coordinates on the object side or the image side, according to need. In order to convert them into the real coordinates on the object side, the sampling interval in the Z axis direction is converted into the step movement interval (unit: μm) of the Z axis stage 5. The sampling interval in the X and Y axes directions is converted into a value obtained by dividing the pixel interval (unit: μm) of the imaging device 10 by the lateral magnification of the microscope optical system 7. It is usually sufficient for this lateral magnification to be a design value of the microscope optical system 7. The same applies to the conversion to the real coordinates on the image side. Thereby, the calculation of one shape of the axis image is terminated.

By the calculation processing procedure described above, one shape of the image axis can be obtained with higher accuracy than the original sampling interval in the lens evaluation apparatus 100. In addition to this, there is also a method of directly fitting a three-dimensional intensity distribution model. However, in that case, it is difficult to follow the complex transformation of the pin-hole image. The calculation processing procedure of the shape of the image axis shown in FIG. 5 has an advantage that such a complex transformation can be absorbed by the combination of relatively simple intensity distribution model functions.

Returning to FIG. 4, the control unit 18 determines whether the shape of the axis image is obtained in all the pin-hole images within the imaging range of the stack image of one wavelength, in other words, whether the number of the pin-hole images in which the shape of the image axis has been obtained, has reached the predetermined number (step S113). When the number of the pin-hole images has reached the predetermined number (S113: Yes), the control unit 18 proceeds to a step S114, while when the number has not reached the predetermined number (S113: No), the step 112 is repeated. As described above, by repeating S112 until the step 113 is satisfied, all the shape of the image axis are calculated from all the pin-holes within the imaging range of the stack image with one wavelength.

Then, the control unit 18 determines whether the shape of the image axis corresponding to each pin-hole image is calculated for all of a plurality of wavelengths, in other words, whether the number of the wavelength in which the shape of the image axis of each pin-hole image is obtained has reached the predetermined number (step S114). When the number of the wavelength has reached the predetermined number (S114: Yes), the control unit 18 proceeds to a step S115, while when the number has not reached the predetermined number (S114: No), the processing from the step S111 is repeated. As described above, by repeating the steps S111 through S113 until the S114 is satisfied, all the shapes of the image axis within the imaging range of each of the stack images with a plurality of wavelengths can be calculated. In other words, the distribution of the shape of the image axis of each wavelength can be calculated.

Subsequently, the control unit 18 makes the evaluation value calculation unit 16 calculate the evaluation equation showing each distribution of the telecentricity and the coma aberration, and accordingly calculates the evaluation value of the telecentricity and the coma aberration on the basis of the obtained evaluation equation (step S115).

Figure 7A:
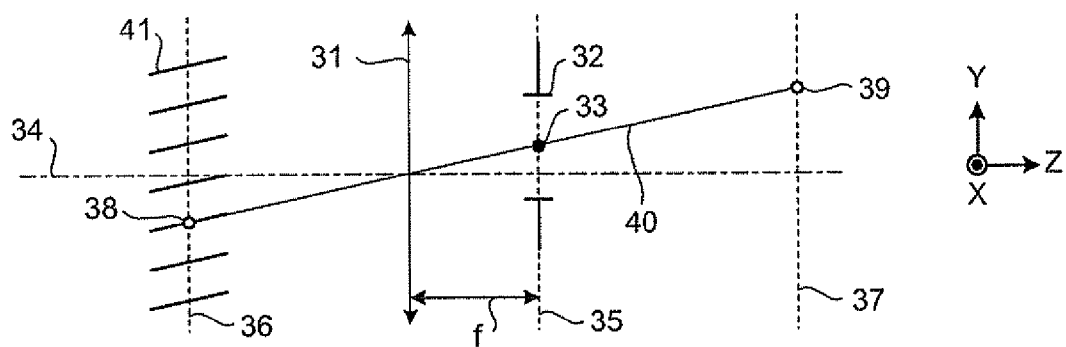
FIGS. 7A and 7B are views for explaining telecentricity.
Figure 7B:
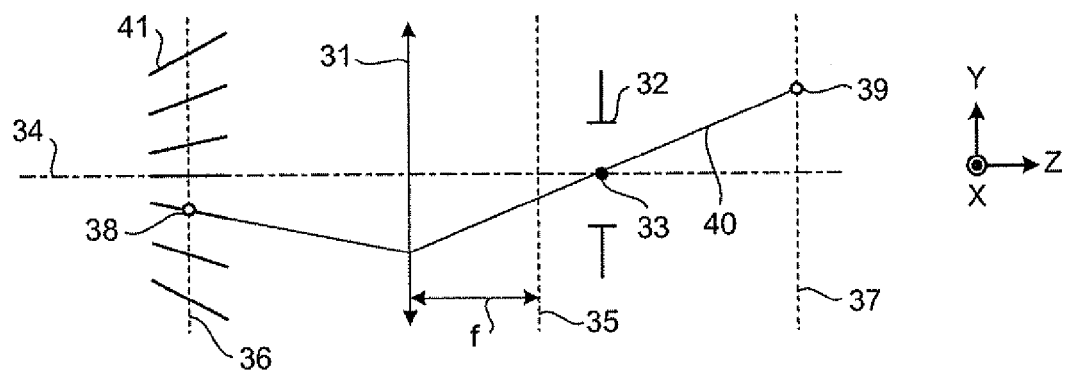

Here, the evaluation equation showing the distribution of the telecentricity is described with reference to FIGS. 7A and 7B. FIGS. 7A and 7B show an object side telecentric optical system as the optical system to be evaluated. A diaphragm 32 of an optical system 31 to be evaluated is disposed on a rear focal surface 35. As shown in FIG. 7A, when a center position 33 of the diaphragm 32 is sifted from an optical axis 34 in the lateral direction (X and Y axes directions), a main beam 40 connecting the corresponding object point 38 and image point 39 is tilted to the optical axis 34 on the object side. If the object point 38 is moved along the tilted main beam 40, the position of the image point 39 on the image surface 37 is not changed (however, this movement causes the blur of the image). However, if the object point 38 is moved in parallel to the optical axis 34 (in the Z axis direction), the position of the image point 39 on the image surface 37 is shifted in the lateral direction. The shift in the lateral direction causes the inclination of the image axis. When the diaphragm 32 is shifted in the lateral direction, all the main beams 41 on the object surface 36 are tilted to the optical axis 34 while being parallel to each other.

Meanwhile, as shown in FIG. 7B, also when the center position 33 of the diaphragm 32 is shifted in the longitudinal direction (Z axis direction), the main beam 40 connecting the corresponding object point 38 and image point 39 is tilted to the optical axis 34 on the object side. However, the inclination of each main beam 41 on the object surface 36 is larger as the main beam 41 is farther from the optical axis 34. According to the calculation using simple paraxial optics, the relation between a lateral shift amount Δρ and a vertical shift amount Δζ of the center position 33 of the diaphragm 32 and inclination α on the object side of the main beam 40 is represented by the following equation (6) using the inclination α on the image side of the main beam 40, a position r of the object point 38, and focal length f of the optical system 31 to be evaluated. The inclination α and the position r are respectively represented by the following equations (7) and (8). The lateral shift amount Δρ is represented by the following equation (9) using its X component Δξ and Y component Δη.

$$a = \frac{\Delta\rho}{f} - \frac{\Delta\zeta}{f^2}r \qquad (6)$$

$$a = \begin{pmatrix} a_x \\ a_y \end{pmatrix} \qquad (7)$$

$$r = \begin{pmatrix} x \\ y \end{pmatrix} \qquad (8)$$

$$\Delta\rho = \begin{pmatrix} \Delta\xi \\ \Delta\eta \end{pmatrix} \qquad (9)$$

Namely, the inclination on the object side of the main beam 40, in other words, the inclination of the image axis $\alpha_x$ and $\alpha_y$ is represented by the primary expression in the X and Y axes directions. The linear model functions as characteristic distribution model functions represented by the following equations (10-1) and (10-2) are respectively fitted to the combination of the corresponding object point coordinates (x, y) and the inclination of the image axis ($\alpha_x$, $\alpha_y$) by the least square method, whereby the evaluation equation showing the distribution of the telecentricity can be obtained.

$$\alpha_x = Ax + B \qquad (10\text{-}1)$$

$$\alpha_y = Ay + D \qquad (10\text{-}2)$$

After the linear model function is fitted, the relational expression between the coefficient of the evaluation equation showing the distribution of the telecentricity and each parameter is obtained as the following equations (11-1) to (11-4). The vertical shift amount Δζ is preferably the average between the coefficients A and C for example.

$$A = -\Delta\zeta/f^2 \qquad (11\text{-}1)$$

$$B = \Delta\xi/f \qquad (11\text{-}2)$$

$$C = -\Delta\zeta/f^2 \qquad (11\text{-}3)$$

$$D = \Delta\eta/f \qquad (11\text{-}4)$$

In the step S115, the evaluation value calculation unit 16 calculates the evaluation value of the inclination of the image axis ($\alpha_x$, $\alpha_y$) corresponding to an arbitrary object coordinates (x, y) from the evaluation equation, obtained as above described, showing the distribution of the telecentricity. The evaluation value calculation unit 16 further can calculate the lateral shift amount Δρ and the vertical shift amount Δζ of the diaphragm of the objective lens 7a as the optical system to be evaluated by using the focal length f of the objective lens 7a.

As with the telecentricity, the distribution of the coma aberration is represented by the primary expression in the X and Y axes directions. Thus, the linear model functions as the characteristic distribution model functions represented by the following equations (12-1) and (12-2) are respectively fitted to the combination of the object point coordinates (x, y) and the curvature of the image axis ($c_x$, $c_y$) by the least square method, whereby the evaluation equation showing the distribution of the coma aberration can be obtained.

$$c_x = A'x + B' \qquad (12\text{-}1)$$

$$c_y = C'y + D' \qquad (12\text{-}2)$$

In the step S115, the evaluation value calculation unit 16 can obtain the evaluation value of the curvature of the image axis ($c_x$, $c_y$) corresponding to the arbitrary object point coordinates (x, y) from the evaluation equation, obtained as above described, showing the distribution of the coma aberration.

Even when the distributions of the inclination of the image axis and the curvature are further complicated due to vignetting in the optical system to be evaluated, it is possible to cope with such a case by modifying the fitting characteristic distribution model function to an appropriate form.

Then, the evaluation value calculation unit 16 subtracts the shape of the image axis with the reference wavelength, obtained by the steps S111 to S114, from one shape of the image axis with the evaluation wavelength obtained by the steps S111 to S114. This calculation is applied to all the shapes of the image axis. Thereby, the evaluation value calculation unit 16 calculates the distributions of a difference of the inclination of the image axis $\Delta\alpha_x(x, y)$ and $\Delta\alpha_y(x, y)$ and the distributions of a difference of the curvature of the image axis $\Delta c_x(x, y)$ and $\Delta c_y(x, y)$ as the function of the object coordinates (x, y) (step S116).

The distributions of the difference of the inclination of the image axis $\Delta\alpha_x(x, y)$ and $\Delta\alpha_y(x, y)$ and the distributions of the difference of the curvature of the image axis $\Delta c_x(x, y)$ and $\Delta c_y(x, y)$ are represented by the primary expression in the X and Y axes directions. Thus, the evaluation value calculation unit 16 fits the linear model function represented by the equations (10-1) and (10-2) to the combination of the corresponding object point coordinates (x, y) and the difference of the inclination of the image axis ($\Delta\alpha_x$, $\Delta\alpha_y$) by the least square method to obtain the evaluation equation of the difference of the telecentricity. In addition, the evaluation value calculation unit 16 fits the linear model function represented by the equations (12-1) and (12-2) to the combination of the corresponding object point coordinates (x, y) and the difference of the curvature of the image axis ($\Delta c_x$, $\Delta c_y$) by the least square method to obtain the evaluation equation of the difference of the coma aberration. On the basis of those evaluation equations, the evaluation value calculation unit 16 can calculate the evaluation value of the difference of the inclination of the image axis and the evaluation value of the difference of the curvature of the image axis respectively corresponding to the arbitrary object point coordinates (x, y).

A drift component such as a sample position progressing in the imaging time of the stack image is measured as the shape of the image axis. However, since the stack images with the plurality of wavelengths are simultaneously imaged, this drift component is eliminated by averaging the above-mentioned difference, whereby only the wavelength dependence of the telecentricity and the coma aberration is evaluated. The evaluation equation of each difference of the telecentricity and the coma aberration may be calculated by the difference of each evaluation equation of the telecentricity and the coma aberration calculated by the step S115.

Then, the control unit 18 determines whether the steps S115 and S116 are applied to all the plurality of wavelengths, in other words, whether the number of the wavelength used for the calculation of the evaluation equation has reached the predetermined number (step S117). When the number of the wavelength has reached the predetermined number (S117: Yes), the control unit 18 terminates the analysis processing, while when the number has not reached the predetermined number (S117: No), the processing from the step S115 is repeated. As described above, the steps S115 and S116 are repeated until the S117 is satisfied, whereby the respective evaluation equations of the telecentricity and the coma aberration with respect to the plurality of wavelengths can be calculated.

Each shape of the image axis has measurement errors due to the error in the amount of movement of the Z axis stage 5, the error of imaging position calculation, and the like. However, by fitting to the characteristic distribution model function as described above, the measurement errors of each shape of the image axis are balanced out by each other, whereby the respective evaluation equations of the telecentricity and the coma aberration can be obtained with high accuracy.

Note that in the lens evaluation apparatus 100, in order to evaluate the distribution of the telecentricity and the distribution of the coma aberration in a single objective lens 7a, it is effective to add the following procedure.

Figure 8:
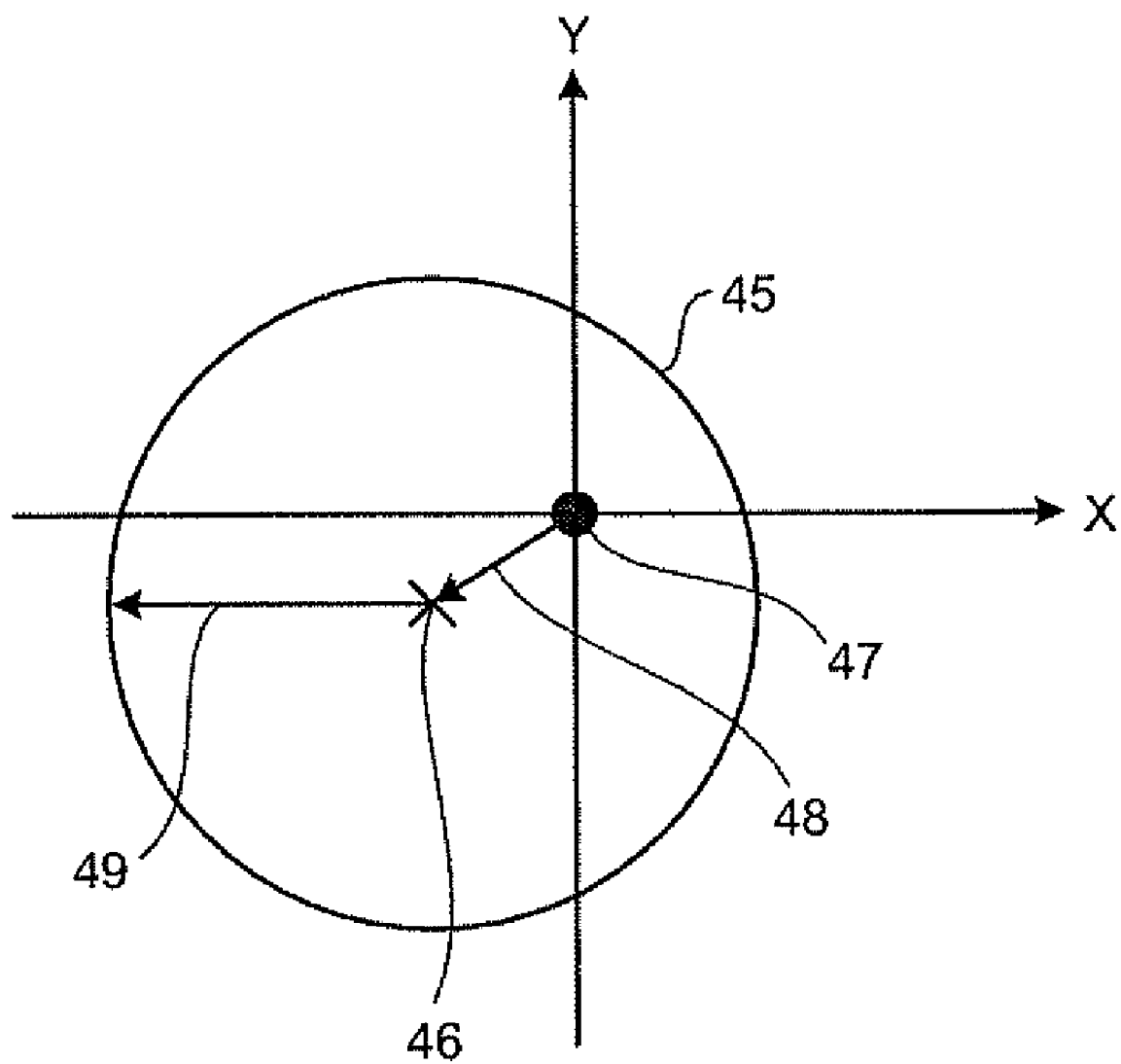
FIG. 8 is a view for explaining the operation of a rotation part.

When the objective lens 7a is rotated by the rotation part 8, regarding the parameter of the X and Y coordinates (e.g., the lateral shift amount of the diaphragm) included in the respective evaluation equations of the distribution of the telecentricity and the distribution of the coma aberration, a component attributable to the objective lens 7a is rotated and moved upon the rotation of the objective lens 7a. The operation is described below with reference to FIG. 8. As shown in FIG. 8, the movement of the X and Y coordinates accompanying the rotation of the objective lens 7a draws the locus of a circle 45. In this case, the center 46 of the circle 45 does not always coincide with the center 47 of the view field. The difference 48 between both is a component attributable to the errors in the disposition of the optical system other than the objective lens 7a and devices. The radius 49 of the circle 45 is a component attributable to the objective lens 7a.

Figure 9:
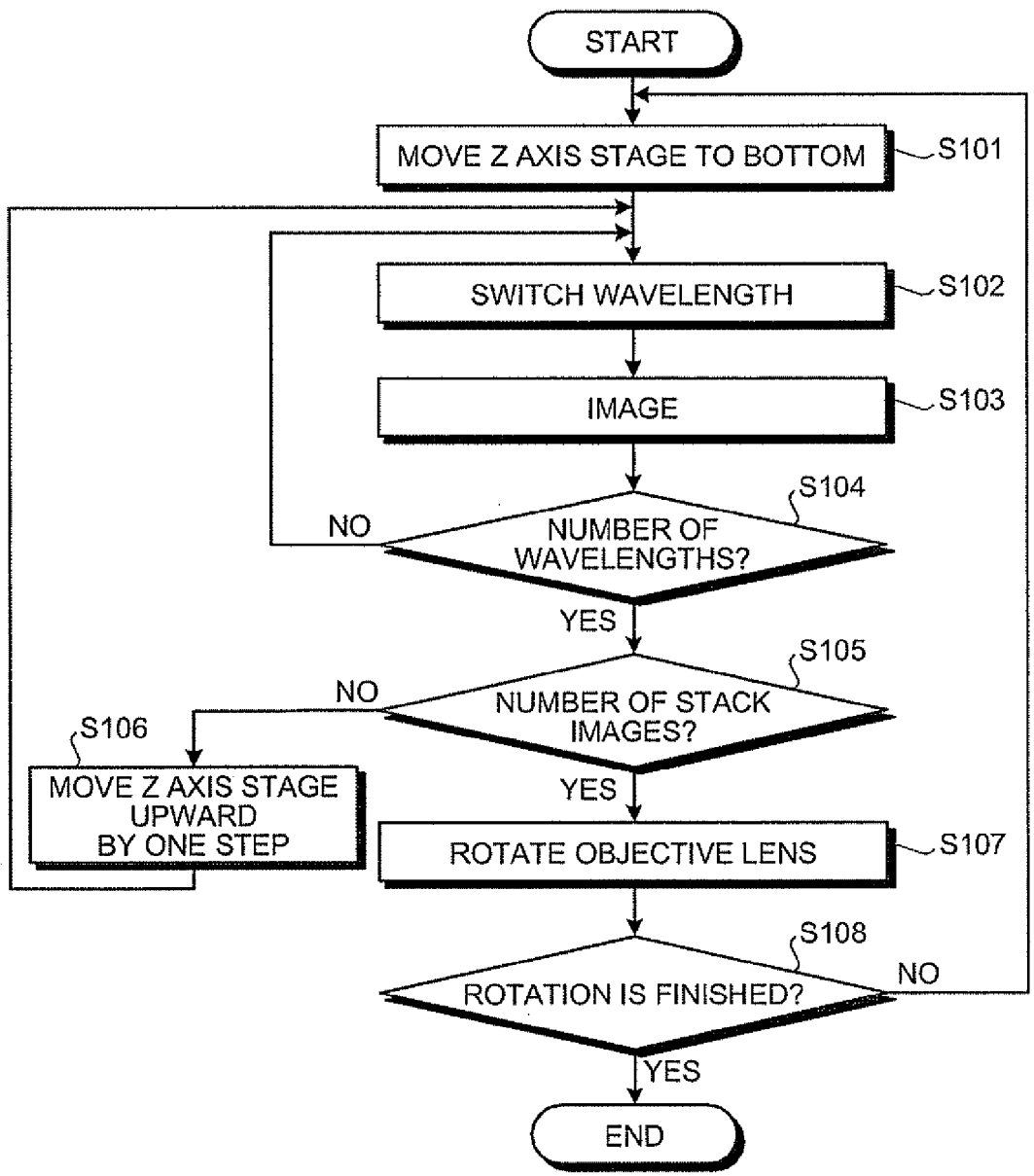
FIG. 9 is a flowchart showing a processing procedure for imaging the stack image, including a rotation processing.

As shown in FIG. 9, the processings in steps S107 and S109 are added in a flowchart shown in FIG. 3, whereby the stack images while the objective lens 7a is rotated is obtained. By way of example, the objective lens 7a is rotated by 180° by the rotation part 8, and the same measurement is then performed. The average of the parameters of the X and Y coordinates of both is a component attributable to other than the objective lens 7a. ½ of the difference between both is a component attributable to the objective lens 7a. Further, if the rotation angle is divided, and the measurement is performed, for example, the center 46 and radius 49 of the circle 45 are calculated at four rotation positions of 0°, 90°, 180° and 270°, both components can be separated with further higher accuracy. The other parameters (vertical shift amount of a diaphragm), included in the respective evaluation equations of the distribution of the telecentricity and the distribution of the coma aberration never change accompanying the rotation of the objective lens 7a. The measurement errors of these values can be improved by averaging the plurality of measurement values.

Additionally, the drift of the positions of the sample 4 and the like progressing in the imaging time is also measured as the shape of the image axis. However, in many cases, since the lateral shift amount due to drift is changed substantially linearly within the imaging time, a measure using the following reciprocating measurement is effective.

In the imaging processing procedure shown in FIG. 3, the stack images of "forward path", in which the relative distance between the sample 4 and the objective lens 7a is sequentially reduced as the Z axis stage is moved from the lower end to the upper end, is imaged. Subsequently, likewise, the stack image of "backward path", in which the relative distance between the sample 4 and the objective lens 7a is sequentially increased as the Z axis stage is moved from the lower end to the upper end, is imaged. Then, the shape of the image axis is calculated from the respective stack images of the forward path and the backward path. Although the shape of the image axis attributable to the telecentricity and the coma aberration is common to the forward path and the backward path, the inclination caused by the linear drift is inverted. Thus, the telecentricity and coma aberration and the drift components can be separated by taking the sum of both or the difference. The calculation of the shape of the image axis according to such a reciprocating change of the relative distance is performed one or more times, especially a plurality of times, whereby the error of the evaluation value can be further reduced.

In addition, increasing the movement amount of one step of the Z axis stage 5 and reducing the imaging time of the stack images are effective to reduce the drift component.

As described above, the lens evaluation apparatus 100 as the optical system evaluation apparatus according to the first embodiment has a plurality of pin-holes 4a as the point light sources arranged in a planar form, and is provided with the sample 4, which is a point image production means for forming, for each pin-hole 4a, a pin-hole image as the point image through the optical system to be evaluated, the light source 1, the optical fiber 2, the light intensity uniformization part 3, the image forming lens 7b, the imaging device 10, which images the plurality of pin-hole images to produce the observation image as the point image distribution image, the Z axis stage 5 as the movement means for changing the relative distance between the optical system to be evaluated and the sample 4 in the optical axis direction of the optical system to be evaluated, the control unit 18 which makes the Z axis stage 5 change the relative distance and makes the imaging device 10 image the observation image in every change of the relative distance, the image axis shape calculation unit 15 which, on the basis of the image information of the stack images which are formed from the plurality of the observation images formed at a different relative distance between the sample 4 and the objective lens 7a, detects the image forming position for each different relative distance of the pin-hole image as the point image, fits the curve model function to the plurality of detected image forming positions to calculate the regression expression, and performs processing for obtaining the shape parameter of the image axis determined by this regression expression for each pin-hole image, and the evaluation value calculation unit 16 which fits the characteristic distribution model function, representing the distribution of the optical characteristics of the optical system to be evaluated, to the shape parameter of the image axis in each pin-hole image and calculates the evaluation value of the optical characteristics of the optical system to be evaluated on the basis of the fitting characteristic distribution model function. The evaluation value calculation unit 16, especially, fits the model function as the characteristic distribution model function representing at least one distribution of the telecentricity and the coma aberration to calculate the evaluation equation showing at lease one distribution of the telecentricity and the coma aberration as the distribution of the optical characteristics of the optical system to be evaluated, and, thus, to calculate the evaluation value on the basis of this evaluation equation.

Therefore, the lens evaluation apparatus 100 can evaluate the distribution of the optical characteristics of the optical system to be evaluated in a short time with high accuracy. Specifically, even when one pin-hole image cannot be imaged with particularly large number of pixels, the evaluation can be performed with high accuracy. In addition, in the lens evaluation apparatus 100, a laser length measuring machine with nm-order accuracy for monitoring the image forming position of the pin-hole image and the like is not required, whereby the high precision evaluation can be realized by simple and inexpensive configuration.

In the first embodiment, the sample 4 is moved on the Z axis stage 5 in the optical direction, and the telecentricity on the object side is then evaluated; however, alternatively the imaging device 10 is moved in the optical axis direction, and the similar imaging processing and analysis processing are then performed, whereby the telecentricity on the image side can be evaluated. As can be seen in the above processing procedure, if the step movement amount of the Z axis stage 5 is recorded as the numerical value, the interval of the step movement amount is not required to be constant.

As long as the sample 4 trans-illuminated by the light source 1 satisfies conditions of being a plurality of point light sources arranged in a planar form, it may have another form. For instance, it may be an incident end of an optical fiber, an illuminant like a fluorescent bead, or the like which are arranged in a planar form. If the pin-hole array specimen as shown in FIG. 2 is assumed to "negative", its "positive" specimen can also be used. Specifically, a specimen in which only the parts of the metal film 4b corresponding to the pin-holes 4a in FIG. 2 are left and the other parts of metal film 4b are removed can be used. This is because the reflection light from each metal film 4b can be regarded to be a plurality of point light sources when such a specimen is epi-illuminated. When evaluating by only one wavelength, an illuminant with a single wavelength, such as a light-emitting diode array can also be used. It is desirable for the size of this point light source to be equal to or less than the resolution of the optical system to be evaluated.

Figure 10:
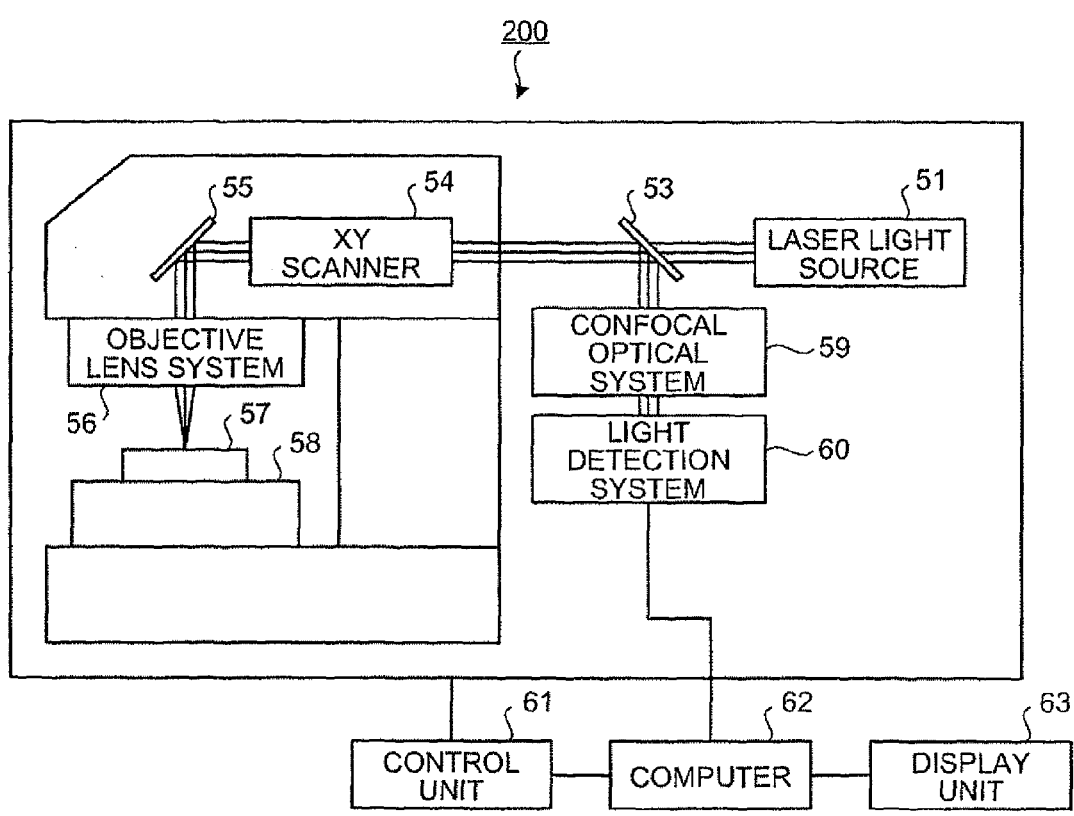
FIG. 10 is a diagram showing a configuration of an optical system evaluation apparatus according to the second embodiment of the present invention.
Figure 11:
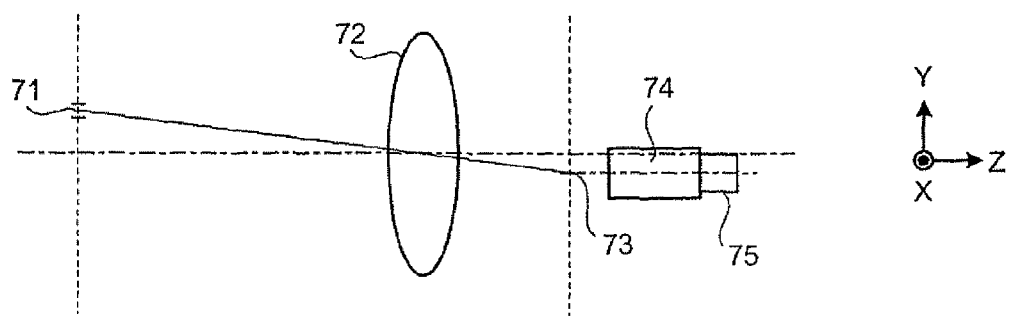
FIG. 11 is a view showing a configuration of the prior art optical system evaluation apparatus.

An optical system evaluation apparatus according to a second embodiment of the present invention is described below. FIG. 10 shows a relevant configuration of a fluorescent confocal microscope 200 as the optical system evaluation apparatus according to the second embodiment. As shown in FIG. 10, the fluorescent confocal microscope 200 is provided with a laser light source 51, a dichroic mirror 53, an XY scanner 54, a total reflection mirror 55, an objective lens system 56, a sample 57, a Z axis stage 58, a confocal optical system 59, a light detection system 60, a control unit 61, a computer 62, and a display unit 63.

The illumination light (excitation light) from the laser light source 51 for selectively emitting laser beams with a plurality of wavelengths is collected to the focal position of the sample 57 by the objective lens system 56 via the XY scanner 54 and the total reflection mirror 55. The reflection light (fluorescent) from the sample 57 is branched and reflected by the dichroic mirror 53, which is provided between the XY scanner 54 and the laser light source 51, via the objective lens system 56 and the total reflector 55 and is then received by the light detection system 60 via the confocal optical system 59. In this case, only reflection light from the focal position on the sample 57 is incident on the light detection system 60 by the confocal effect of the confocal optical system 59. The incident light is photoelectrically converted by the light detection system 60 to be transmitted to the computer 62 as brightness information.

The XY scanner 54 is constituted by using an X galvano-mirror for swinging the luminous flux of the illumination light from the laser light source 51 to the X axis direction and a Y galvano-mirror for swinging the luminous flux to the Y axis direction perpendicular to the X axis direction, and can scan the light converging position in the sample 57 in the X and Y axes directions that are perpendicular to each other against the optical axis of the objective lens system 56.

The Z axis stage 58 moves the sample 57 in the Z axis direction as the optical axis direction with holding the sample 57 placed thereon. The Z axis stage 58 moves the sample 57 in the optical axis direction and therefore can move the focal position of the sample 57 in the optical axis direction.

The computer 62 builds up the scan image of the sample 57 on the basis of the brightness information output from the light detection system 60 in accordance with the scanning through the sample 57 of the illumination light by the XY scanner 54. The built scan image can be viewed by displaying it on the display unit 63. In addition, the computer 62 is provided with an image axis shape calculation unit, an evaluation value calculation unit, a storage unit, and a control unit (not shown) as with the control device 14 according to the first embodiment. The control unit 61 controls the laser light source 51, the XY scanner 54, the Z axis stage 58, and the like, which are connected to each other, on the basis of instructions of the computer 62.

Next, the processing for imaging the stack image, which is used for calculating the evaluation values of the shape of the image axis, in the fluorescent confocal microscope 200 is described. In this case, the sample 57 is a specimen having a plurality of reflective pin-holes formed therein in which only the parts of the metal film 4b corresponding to the pin-holes 4a shown in FIG. 2 are left and the other parts of the metal film 4b are removed. The metal film 4b is removed from the region other than the reflective pin-holes.

The operator focuses a stack image by the Z axis stage 58 while monitoring the observation image obtained by the scanning of the XY scanner 54 on a display unit 63. Then, the CPU of the computer 62 starts executing an imaging program. This imaging program is a part of a control program recorded in the storage unit of the computer 62 and automatically controls to image the stack image with a plurality of wavelengths. The imaging processing procedure by this imaging program is described below with reference to FIG. 3. The plurality of wavelengths can be alternatively oscillated from the laser light source 51 in accordance with the control from the control unit 61.

The control unit 61 first moves the Z axis stage 58 from the focus position (position after the focusing) to the bottom of the imaging range (step S101). It is desirable to set the imaging range in the Z axis direction to approximately several times of focal depth in such a way as to include the field curvature and the chromatic aberration range in the longitudinal direction of the objective lens system 56 as the optical system to be evaluated.

Then, the control unit 61 switches the wavelength of the laser light source 51, whereby switching the wavelength of the illumination light to one wavelength in which the observation image is not imaged yet in the current Z axis stage position, among the plurality of wavelengths (step S102).

Then, the control unit 61 images the observation image of the sample 57 by the scanning of the XY scanner 54 to record the observation image in the storage unit of the computer 62 (step S103).

Then, the control unit 61 determines whether steps S112 and S113 are applied to all the plurality of wavelengths in the current Z axis stage position, in other words, whether the number of the wavelengths used for the imaging has reached the predetermined number (step S104). When the number of the wavelengths has reached the predetermined number (S304: Yes), the control unit 61 proceeds to a step S105, while when the number has not reached the predetermined number (S104: No), the processing from S102 is repeated. As described above, by repeating the steps S102 and S103 until the step S104 is satisfied, the image files of the observation images of each of the plurality of wavelengths in the current Z axis stage position are stored in the storage unit of the computer 62.

Then, the control unit 61 determines whether the number of the image files of each wavelength stored in the storage unit of the computer 62 has reached the number of stack images covering a predetermined imaging range in the Z direction (Step S105). When the number of the image files has reached the number of the stack images (S105: Yes), the control unit 61 terminates the imaging processing, while when the number has not reached the number of the stack images (S105: No), the Z axis stage 58 is moved upward by one step (step S106), and thereafter the processing from S102 is repeated. The movement amount of one step is desirably about ⅕ to 1/10 of the focal depth of the objective lens system 56 to be evaluated.

As described above, by repeating the steps S102 through S104 and S106 until the step S105 is satisfied, the image files of each wavelength for the number of stack images covering the predetermined imaging range in the Z axis direction are stored as the stack images in the storage unit of the computer 62.

In the fluorescent confocal microscope 200, on the basis of the stack images imaged as above described, the shape of the image axis corresponding to each pin-hole image is obtained by the analysis processing as in the lens evaluation apparatus 100, and, at the same time, the evaluation value of the distribution of the telecentricity and the distribution of the coma aberration as the distribution of the optical characteristics of the objective lens system 56 is calculated on the basis of the shape of the image axis. Accordingly, in the fluorescent confocal microscope 200, as with the lens evaluation apparatus 100, the distribution of the optical characteristics of the objective lens system 56 can be evaluated in a short time with high accuracy.

In the second embodiment, although the fluorescent confocal microscope 200 scans through the sample 57 by one light converging point, the present invention is also applicable to a confocal microscope which uses a Nipknow disk or the like and scans through a sample by a plurality of light converging points.

The excitation light and the fluorescent light are somewhat different in the fluorescent confocal microscope 200. In the second embodiment, the evaluation is performed by only excitation light wavelengths; however, when a plurality of fluorescent bead samples arranged in a planar form is adopted as the sample 57 with a point light source array, it is possible to realize more accurate evaluation including a wavelength difference between the excitation light and the fluorescent light. Alternatively, as in the first embodiment, a point light source array may be formed by the trans-illumination, using a pin-hole array specimen. In this case, since an arbitrary evaluation wavelength can be set to be different from a laser light source, the shape of the image axis and the distribution of the optical characteristics can be evaluated by a fluorescent light wavelength or the intermediate wavelength between the excitation light and the fluorescent light.

As the preferred embodiments of the present invention, the first and the second embodiments have been described; however, the present invention is not limited to these embodiments, various modifications can be made without departing from the scope of the invention.

By way of example, the optical system evaluation apparatus according to the present invention can also be applied to optical systems other than a microscope. As the optical system other than a microscope, there are various image-forming optical systems including a reflection system, a catadioptric system, or the like, in addition to a lens system (refracting system). However, in that case, depending on the size of the view field and the resolution of an optical system to be evaluated, appropriate point light sources are required. This also applies to the step movement amount and movement range of a movement mechanism for imaging a stack image. The requirements necessary in that case is already clear from the above description. For the processing procedure for calculating the evaluation equations of the respective distributions of the telecentricity and the coma aberration from the stack image, the same one as in the microscopic optical system can be applied.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. An apparatus for evaluating optical characteristics of an optical system based on an image forming position of a point image that is formed from a point light source through the optical system, the apparatus comprising:

a point image producing unit that has a plurality of the point light sources positioned in vicinity of an object surface of the optical system and arranged in a planar form, and forms a plurality of the point images through the optical system from the point light sources;

an imaging unit that images a plurality of the point images to produce a point image distribution image;

a moving unit that changes relative distance between the optical system and the point light source or the imaging unit in an optical axis direction of the optical system;

an imaging control unit that controls the moving unit to change the relative distance, and controls the imaging unit to image the point image distribution image in every change of the relative distance;

an image axis shape calculation unit that performs processing of detecting an image forming position in each different relative distance of the point image based on image information of a plurality of the point image distribution images imaged at the different relative distance, the processing including calculating a regression expression concerning the image forming position and the relative distance for each of the point images to obtain a shape parameter of the image axis determined by the regression expression in each of the plurality of point images; and an evaluation value calculation unit that fits a characteristic distribution model function representing distribution of the optical characteristics to the shape parameter in each of the plurality of point images, and calculates an evaluation value of the optical characteristics based on the fitting characteristics distribution model function.

2. The apparatus according to claim 1, wherein the characteristic distribution model function represents at least one distribution of telecentricity and coma aberration.

3. The apparatus according to claim 1, wherein the image axis shape calculation unit includes an intensity distribution fitting unit that fits an intensity distribution model function representing two-dimensional intensity distribution of a point image region, in which the point image is imaged, to the point image region in each of the point distribution images imaged at the different relative distance;

an intensity position calculation unit that detects a planar coordinate on the point image distribution image with the maximum intensity distribution model function, fitted by the intensity distribution fitting unit, in each of the point image distribution images imaged at the different relative distance, and calculates the maximum intensity position of the point image in the relative distance in which the point image distribution image is imaged as the image forming position of the point image, using the detected planar coordinate; and a curve fitting unit that fits a curve model function as the regression expression to a plurality of the maximum intensity positions at each of the different relative distance and obtains a coefficient of the fitting curve model function as the shape parameter.

4. The apparatus according to claim 3, wherein the image axis shape calculation unit includes a range setting unit that sets a fitting range of the intensity distribution model function to the point image, and the intensity distribution fitting unit fits the intensity distribution model function to the point image region in each of the point distribution image imaged at the different relative distance within the fitting range.

5. The apparatus according to claim 3, wherein the intensity distribution model function is a two-dimensional Gaussian distribution function.

6. The apparatus according to claim 3, wherein the curve model function is a linear model function representing a straight line.

7. The apparatus according to claim 3, wherein the curve model function is a quadratic curve model function representing a quadratic curve.

8. The apparatus according to claim 1, wherein the image axis shape calculation unit includes an intensity position calculation unit that detects a pixel position representing the maximum brightness in the point image region, in which the point image is imaged, in each of the image distribution images imaged at the different relative distance and calculates, as the image forming position of the point image, the maximum intensity position of the point image in the relative distance, in which the point image distribution image is imaged, on the basis of the detected pixel position; and a curve fitting unit that fits a curve model function as the regression expression to a plurality of the maximum intensity positions in each of the different relative distance and obtains a coefficient of the fitting curve model function as the shape parameter.

9. The apparatus according to claim 8, wherein the image axis shape calculation unit includes a range setting unit that sets a retrieval range of the pixel position to the point image, and the intensity position calculation unit detects the pixel position in each of the point image distribution images imaged at the different relative distance within the retrieval range.

10. The apparatus according to claim 1, wherein the point image production unit makes the point light source emit light in a plurality of wavelength ranges in a switchable manner and forms the point image in each of the light in the plurality of wavelength ranges, the imaging control unit controls the point image production unit to sequentially form the point image with light in the plurality of wavelength ranges in every change of the relative distance by the moving unit and controls the imaging unit to image the point image distribution image in each light in the plurality of wavelength ranges, the image axis shape calculation unit performs processing for obtaining the shape parameter in each of the plurality of point images in each of the light in the plurality of wavelength ranges and calculates a difference parameter representing a difference between the respective shape parameters in light in a first wavelength range and light in a second wavelength range, regarding the light in the plurality of wavelength ranges, and the evaluation value calculation unit fits a difference distribution model function, representing the distribution of the difference of the respective optical characteristics in the light in the first wavelength range and the light in the second wavelength range, to each of the difference parameters in each of the plurality of point images and calculates the evaluation value of the difference of the optical characteristics based on the fitting difference distribution model function.

11. The apparatus according to claim 1, further comprising a rotation unit that rotates a partial optical system, including at least one part of the optical system, around an optical axis of the partial optical system, wherein the evaluation value calculation unit calculates an evaluation value of the optical characteristics to difference rotation positions of the partial optical system by the rotation unit and separates the evaluation values of the optical characteristics into a component corresponding to the partial optical system and a component corresponding to other than the partial optical system based on the plurality of the calculated evaluation values of the optical characteristics.

12. The apparatus according to claim 1, wherein the imaging control unit controls the moving unit to perform at least one time of reciprocating change in which the relative distance is increased and reduced within a predetermined range and controls the imaging unit to image the point image distribution image in every change of the relative distance while increasing and reducing the relative distance, the image axis shape calculation unit obtains the shape parameters, respectively corresponding to the relative distance being increased and the relative distance being reduced, in each of the plurality of point images on the basis of image information of a plurality of the point image distribution images imaged while increasing and reducing the relative distance, and the evaluation value calculation unit calculates the evaluation value of the optical characteristics, respectively corresponding to the relative distance being increased and the relative distance being reduced, based on the shape parameter respectively corresponding to the relative distance being increased and the relative distance being reduced and separates the evaluation value of the optical characteristics into a component corresponding to the optical system and a component corresponding to other than the optical system based on the plurality of calculated evaluation values of the optical characteristics.

13. The apparatus according to claim 1, wherein the optical system includes a diaphragm, the characteristics distribution model function represents distribution of telecentricity, and the evaluation value calculation unit calculates at least one of a lateral shift amount of the diaphragm and the vertical shift amount thereof based on the characteristics distribution model function.

14. The apparatus according to claim 1, wherein the point image production unit includes a plurality of pin-holes each having a diameter equal to or less than the resolution of the optical system and arranged in a planar form, and an illumination unit for trans-illuminating the plurality of pin-holes, and the plurality of pin-holes illuminated by the illumination unit are used as the plurality of point light sources.

15. The apparatus according to claim 1, wherein the point image production unit includes a plurality of micro reflecting mirrors each having a diameter equal to or less than the resolution of the optical system and arranged in a planar form, and an illumination unit for epi-illuminating the plurality of micro reflecting mirrors, and the plurality of micro reflecting mirrors illuminated by the illumination unit are used as the plurality of point light sources.

16. The apparatus according to claim 1, wherein the imaging unit includes a two-dimensional imaging device, and the plurality of point images are imaged by the two-dimensional imaging device.

17. The apparatus according to claim 1, wherein the point image production unit comprises a confocal optical system provided conjugate with the plurality of point light sources in the optical system and performs confocal detection to the point image through the confocal optical system in each of the point light sources.

18. The apparatus according to claim 1, wherein the imaging control unit controls the point image production unit to sequentially emit light from the plurality of point light sources to sequentially form the plurality of point images in each movement of the relative distance by the moving unit, and controls the imaging unit to sequentially image the sequentially formed point images to produce the point image distribution image.

19. The apparatus according to claim 1, wherein the optical system to is a telecentric optical system.

20. The apparatus according to claim 19, wherein the moving unit changes the relative distance on a telecentric side of the optical system.

21. The apparatus according to claim 1, wherein the optical system is a microscope optical system used for a microscope.

22. The apparatus according to claim 21, wherein at least a part of the optical system is an objective lens.

23. The apparatus according to claim 1, wherein the plurality of point light sources is arranged on a plane orthogonal to an optical axis of the optical system; and the imaging unit images, in vicinity of the image forming position of the plurality of point light sources, the point images formed through the optical system to produce the point image distribution image.

24. A method for evaluating optical characteristics of an optical system based on an image forming position of a point image that is formed from a point light source through the optical system, the method comprising:

forming a point image through the optical system in each of a plurality of the point light sources positioned in vicinity of an object surface of the optical system and arranged in a planar;

imaging a plurality of the point images by an imaging unit to produce a point image distribution image;

changing relative distance between the optical system and the point light source or the imaging unit in an optical axis direction of the optical system;

controlling the imaging unit to image the point image distribution image in every change of the relative distance;

performing, in each of the plurality of point images, processing for detecting an image forming position in each different relative distance of the point image based on image information of a plurality of the point image distribution images imaged at the different relative distance, the processing including calculating a regression expression concerning the image forming position and the relative distance for each of the point images to obtain a shape parameter of the image axis determined by the regression expression in each of the plurality of point images;

fitting a characteristic distribution model function representing distribution of the optical characteristics to the shape parameter; and calculating an evaluation value of the optical characteristics based on the fitting characteristics distribution model function.

25. The method according to claim 24, wherein the characteristic distribution model function represents at least one distribution of telecentricity and coma aberration.

26. The method according to claim 24, wherein
the processing includes
fitting an intensity distribution model function representing two-dimensional intensity distribution of a point image region, in which the point image is imaged, to the point image region in each of the point distribution images imaged at the different relative distance;

detecting a planar coordinate on the point image distribution image with the maximum intensity distribution model function, fitted by the intensity distribution fitting unit, in each of the point image distribution images imaged at the different relative distance;

calculating the maximum intensity position of the point image in the relative distance in which the point image distribution image is imaged as the image fowling position of the point image, using the detected planar coordinate; and fitting a curve model function as the regression expression to a plurality of the maximum intensity positions at each of the different relative distance to obtain a coefficient of the fitting curve model function as the shape parameter.

27. The method according to claim 26, wherein the processing includes setting a fitting range of the intensity distribution model function to the point image, and the fitting the intensity distribution model function includes fitting the intensity distribution model function to the point image region in each of the point distribution image imaged at the different relative distance within the fitting range.

28. The method according to claim 26, wherein the intensity distribution model function is a two-dimensional Gaussian distribution function.

29. The method according to claim 26, wherein the curve model function is a linear model function representing a straight line.

30. The method according to claim 26, wherein the curve model function is a quadratic curve model function representing a quadratic curve.

31. The method according to claim 24, wherein the processing includes
detecting a pixel position representing the maximum brightness in the point image region, in which the point image is imaged, in each of the image distribution images imaged at the different relative distance;

calculating, as the image forming position of the point image, the maximum intensity position of the point image in the relative distance, in which the point image distribution image is imaged, on the basis of the detected pixel position; and fitting a curve model function as the regression expression to a plurality of the maximum intensity positions in each of the different relative distance to obtain a coefficient of the fitting curve model function as the shape parameter.

32. The method according to claim 31, wherein the processing includes setting a retrieval range of the pixel position to the point image, and the calculating the maximum intensity position includes detecting the pixel position in each of the point image distribution images imaged at the different relative distance within the retrieval range.

33. The method according to claim 24, wherein
the forming includes making the point light source emit light in a plurality of wavelength ranges in a switchable manner and forming the point image in each of the light in the plurality of wavelength ranges, the controlling the imaging unit includes imaging control unit controls the point image production unit to sequentially form the point image with light in the plurality of wavelength ranges in every change of the relative distance by the changing and controlling the imaging unit to image the point image distribution image in each light in the plurality of wavelength ranges, the processing is performed in each light in the plurality of wavelength ranges, and calculating a difference parameter representing a difference between the respective shape parameters in light in a first wavelength range and light in a second wavelength range, and the calculating the evaluation value includes fitting a difference distribution model function, representing the distribution of the difference of the respective optical characteristics in the light in the first wavelength range and the light in the second wavelength range, to each of the difference parameters in each of the plurality of point images, and calculating the evaluation value of the difference of the optical characteristics based on the fitting difference distribution model function.

34. The method according to claim 24, further comprising rotating a partial optical system, including at least one part of the optical system, around an optical axis of the partial optical system, wherein
the calculating the evaluation value includes calculating an evaluation value of the optical characteristics to difference rotation positions of the partial optical system by the rotating, and separating the evaluation values of the optical characteristics into a component corresponding to the partial optical system and a component corresponding to other than the partial optical system based on the plurality of the calculated evaluation values of the optical characteristics.

35. The method according to claim 24, wherein the controlling the imaging unit includes controlling the moving unit to perform at least one time of reciprocating change in which the relative distance is increased and reduced within a predetermined range and controlling the imaging unit to image the point image distribution image in every change of the relative distance while increasing and reducing the relative distance, the processing includes obtaining the shape parameters, respectively corresponding to the relative distance being increased and the relative distance being reduced, in each of the plurality of point images based on image information of a plurality of the point image distribution images imaged while increasing and reducing the relative distance, and the calculating the evaluation value includes calculating the evaluation value of the optical characteristics, respectively corresponding to the relative distance being increased and the relative distance being reduced, based on the shape parameter respectively corresponding to the relative distance being increased and the relative distance being reduced, and separating the evaluation value of the optical characteristics into a component corresponding to the optical system and a component corresponding to other than the optical system based on the plurality of calculated evaluation values of the optical characteristics.

36. The method according to claim 24, wherein the optical system includes a diaphragm,
the characteristics distribution model function represents distribution of telecentricity, and
the evaluation value calculation unit calculates at least one of a lateral shift amount of the diaphragm and the vertical shift amount thereof based on the characteristics distribution model function.

37. A computer program product having a computer readable medium including programmed instructions for evaluating optical characteristics of an optical system based on an image forming position of a point image that is formed from a point light source through the optical system, wherein the instructions, when executed by a computer, cause the computer to perform:
forming a point image through the optical system in each of a plurality of the point light sources positioned in vicinity of an object surface of the optical system and arranged in a planar form;
imaging a plurality of the point images by an imaging unit to produce a point image distribution image;
changing relative distance between the optical system and the point light source or the imaging unit in an optical axis direction of the optical system;
controlling the imaging unit to image the point image distribution image in every change of the relative distance;
performing, in each of the plurality of point images, processing for detecting an image forming position in each different relative distance of the point image based on image information of a plurality of the point image distribution images imaged at the different relative distance, the processing including calculating a regression expression concerning the image forming position and the relative distance for each of the point images to obtain a shape parameter of the image axis determined by the regression expression in each of the plurality of point images;
fitting a characteristic distribution model function representing distribution of the optical characteristics to the shape parameter; and
calculating an evaluation value of the optical characteristics based on the fitting characteristics distribution model function.

38. The computer program product according to claim 37, wherein the characteristic distribution model function represents at least one distribution of telecentricity and coma aberration.

39. The computer program product according to claim 37, wherein
the processing includes
fitting an intensity distribution model function representing two-dimensional intensity distribution of a point image region, in which the point image is imaged, to the point image region in each of the point distribution images imaged at the different relative distance;
detecting a planar coordinate on the point image distribution image with the maximum intensity distribution model function, fitted by the intensity distribution fitting unit, in each of the point image distribution images imaged at the different relative distance;
calculating the maximum intensity position of the point image in the relative distance in which the point image distribution image is imaged as the image forming position of the point image, using the detected planar coordinate; and
fitting a curve model function as the regression expression to a plurality of the maximum intensity positions at each of the different relative distance to obtain a coefficient of the fitting curve model function as the shape parameter.

40. The computer program product according to claim 39, wherein the processing includes setting a fitting range of the intensity distribution model function to the point image, and the fitting the intensity distribution model function includes fitting the intensity distribution model function to the point image region in each of the point distribution image imaged at the different relative distance within the fitting range.

41. The computer program product according to claim 39, wherein the intensity distribution model function is a two-dimensional Gaussian distribution function.

42. The computer program product according to claim 39, wherein the curve model function is a linear model function representing a straight line.

43. The computer program product according to claim 39, wherein the curve model function is a quadratic curve model function representing a quadratic curve.

44. The computer program product according to claim 37, wherein the processing includes
detecting a pixel position representing the maximum brightness in the point image region, in which the point image is imaged, in each of the image distribution images imaged at the different relative distance;
calculating, as the image forming position of the point image, the maximum intensity position of the point image in the relative distance, in which the point image distribution image is imaged, on the basis of the detected pixel position; and
fitting a curve model function as the regression expression to a plurality of the maximum intensity positions in each of the different relative distance to obtain a coefficient of the fitting curve model function as the shape parameter.

45. The computer program product according to claim 44, wherein the processing includes setting a retrieval range of the pixel position to the point image, and
the calculating the maximum intensity position includes detecting the pixel position in each of the point image distribution images imaged at the different relative distance within the retrieval range.

46. The computer program product according to claim 37, wherein
the forming includes making the point light source emit light in a plurality of wavelength ranges in a switchable manner and forming the point image in each of the light in the plurality of wavelength ranges,
the controlling the imaging unit includes imaging control unit controls the point image production unit to sequentially form the point image with light in the plurality of wavelength ranges in every change of the relative distance by the changing and controlling the imaging unit to image the point image distribution image in each light in the plurality of wavelength ranges,
the processing is performed in each light in the plurality of wavelength ranges, and calculating a difference parameter representing a difference between the respective shape parameters in light in a first wavelength range and light in a second wavelength range, and
the calculating the evaluation value includes fitting a difference distribution model function, representing the distribution of the difference of the respective optical characteristics in the light in the first wavelength range and the light in the second wavelength range, to each of the difference parameters in each of the plurality of point images, and calculating the evaluation value of the difference of the optical characteristics based on the fitting difference distribution model function.

47. The computer program product according to claim 37, wherein the instructions further cause the computer perform rotating a partial optical system, including at least one part of the optical system, around an optical axis of the partial optical system, and the calculating the evaluation value includes calculating an evaluation value of the optical characteristics to difference rotation positions of the partial optical system by the rotating, and separating the evaluation values of the optical characteristics into a component corresponding to the partial optical system and a component corresponding to other than the partial optical system based on the plurality of the calculated evaluation values of the optical characteristics.

48. The computer program product according to claim 37, wherein the controlling the imaging unit includes controlling the moving unit to perform at least one time of reciprocating change in which the relative distance is increased and reduced within a predetermined range and controlling the imaging unit to image the point image distribution image in every change of the relative distance while increasing and reducing the relative distance, the processing includes obtaining the shape parameters, respectively corresponding to the relative distance being increased and the relative distance being reduced, in each of the plurality of point images based on image information of a plurality of the point image distribution images imaged while increasing and reducing the relative distance, and the calculating the evaluation value includes calculating the evaluation value of the optical characteristics, respectively corresponding to the relative distance being increased and the relative distance being reduced, based on the shape parameter respectively corresponding to the relative distance being increased and the relative distance being reduced, and separating the evaluation value of the optical characteristics into a component corresponding to the optical system and a component corresponding to other than the optical system based on the plurality of calculated evaluation values of the optical characteristics.

49. The computer program product according to claim 37, wherein the optical system includes a diaphragm, the characteristics distribution model function represents distribution of telecentricity, and the evaluation value calculation unit calculates at least one of a lateral shift amount of the diaphragm and the vertical shift amount thereof based on the characteristics distribution model function.

* * * * *